No. 849,087. PATENTED APR. 2, 1907.
M. I. ROSENTHAL.
CLUTCH MECHANISM.
APPLICATION FILED JUNE 7, 1905.
2 SHEETS—SHEET 2.
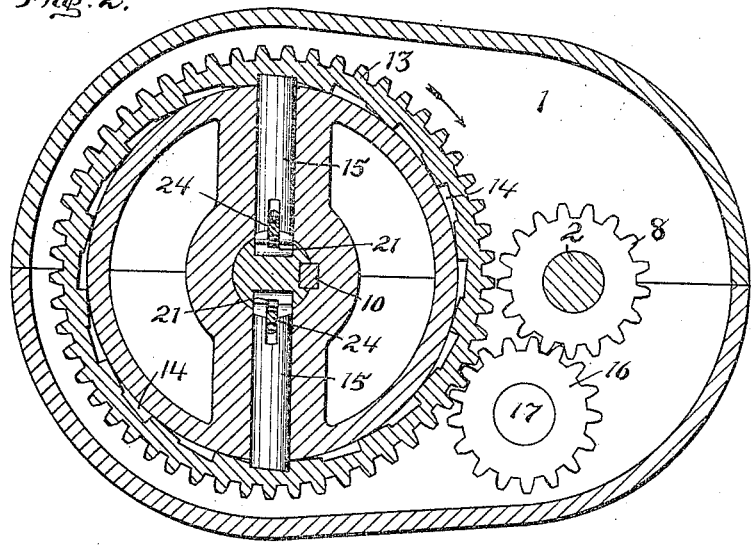
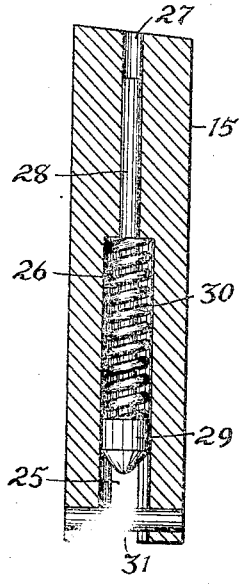
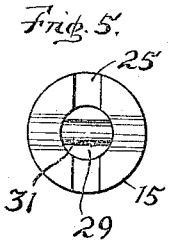
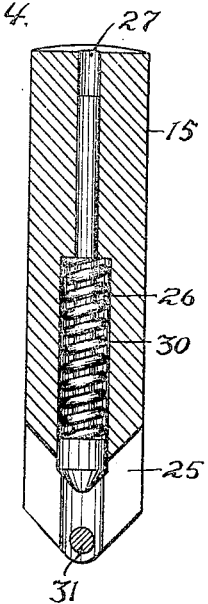
WITNESSES: Maurice I. Rosenthal INVENTOR
ATTORNEY

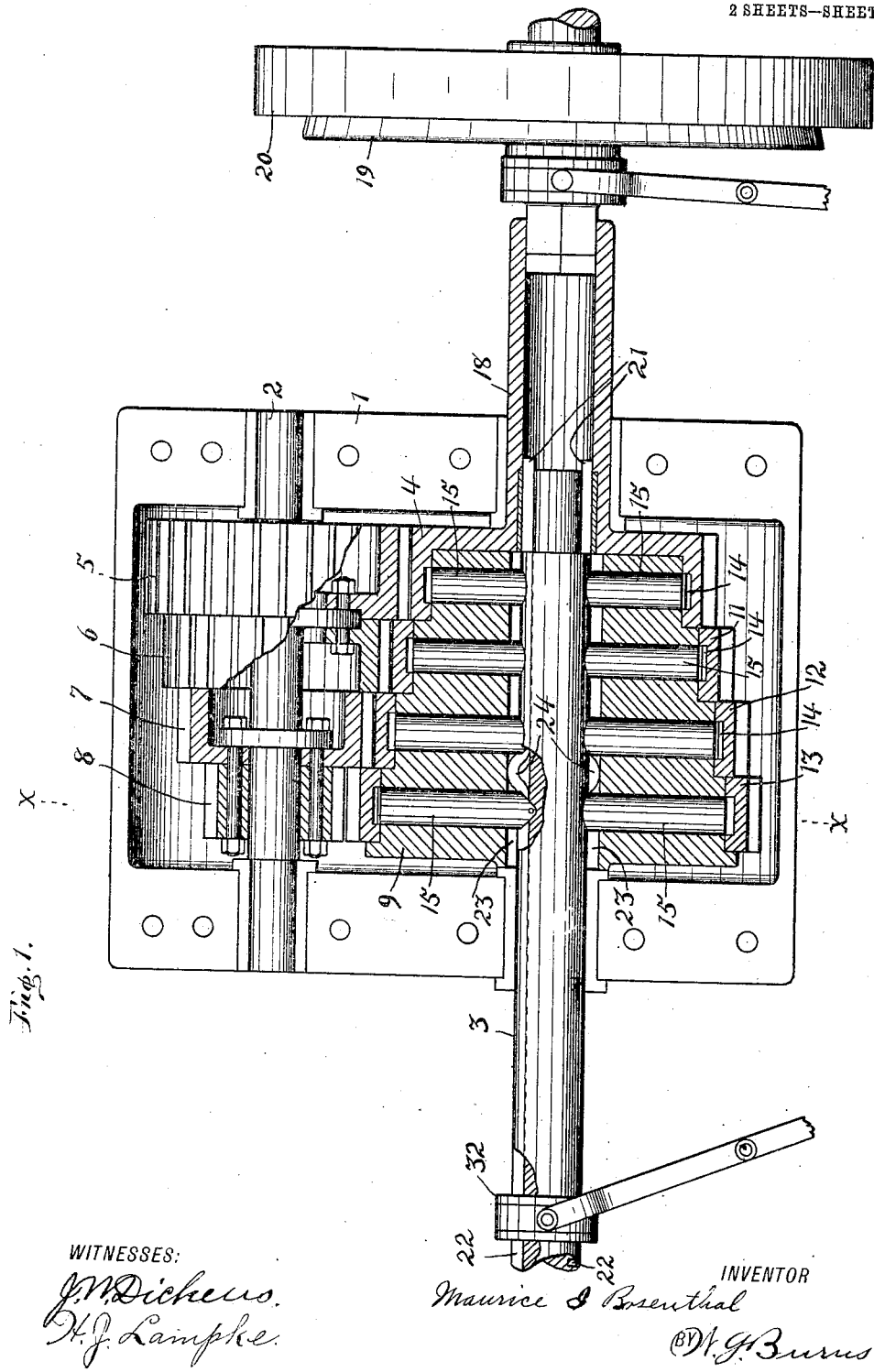

UNITED STATES PATENT OFFICE.

MAURICE I. ROSENTHAL, OF FORT WAYNE, INDIANA.

CLUTCH MECHANISM.

No. 849,087.　　　Specification of Letters Patent.　　　Patented April 2, 1907.

Application filed June 7, 1905. Serial No. 264,046.

*To all whom it may concern:*

Be it known that I, MAURICE I. ROSENTHAL, a citizen of the United States of America, and a resident of Fort Wayne, in the county of Allen and State of Indiana, have invented certain new and useful Improvements in Clutch Mechanism, of which the following is a specification.

This invention relates to improvements in clutch mechanism; and the object thereof is to afford means for effecting engagement between a driving and driven member while either or both of said parts are in motion and also to provide positive means for disengaging the latter member from the former.

Another object of this invention is to provide relief mechanism for the clutch-dogs which will act to relieve the dogs as they are pressed outwardly to engage with the driving member until they become properly seated in connection therewith.

The above objects are accomplished by the construction illustrated in the accompanying drawings, in which—

Figure 1 is a plan view of a variable-speed transmission-gear with a portion thereof in cross-section and showing the movable dogs in connection therewith. Fig. 2 is a transverse section of Fig. 1 partially on the line $x$ $x$. Fig. 3 is a central section through one of the dogs. Fig. 4 is a similar view of one of the dogs, the section being in a plane at right angles to that of Fig. 3. Fig. 5 is a plan view of the inner end of the dog shown in Figs. 3 and 4.

Similar numerals of reference indicate corresponding parts throughout the several views, and, referring now to the same—

1 is a gear-case in which is mounted a counter-shaft 2, a driven shaft 3, and a driving-gear 4. The axes of the two latter are in alinement and the axis of the former is parallel therewith. Upon the counter-shaft is mounted a series of gears 5, 6, 7, and 8, respectively, and all are secured in connection with the counter-shaft, so as to rotate together, and the gear 5 meshes with the driving-gear 4 and is driven thereby.

Within the case and upon the driven member 3 is mounted a clutch member 9, the relation between the clutch member and the driven member being fixed by means of a key 10. Upon the clutch member are loosely mounted a series of toothed rings 11, 12, and 13 of various diameters which, with the exception of the ring 13, mesh, respectively, with the corresponding gears 6 and 7 and are driven thereby. An intermediate gear 16 is loosely mounted upon a stud 17, which projects within the case 1, and the said intermediate gear meshes with the gear 8 and also with the ring 13, and it will therefore appear that the motion of the ring 13 will be in the opposite direction to that imparted to the rings 11 and 12.

Upon the inner surfaces of each of the rings and also that of the driving-gear are made a series of notches 14, which are adapted to receive the outer ends of the corresponding dogs 15, which have movable relation with the clutch member 9.

The shank 18 of the driving-gear 4 is hollow and has driving relation with a friction-disk 19, the latter being adapted to be actuated by the engine-wheel 20. The said shank is made hollow to admit of longitudinal movement therein of the ends of the actuating-bars 21, which are movably seated in diametrically opposite longitudinal grooves 22, made in the driven member 3. Slots 23 are also made in the clutch member 9, which register with the grooves 22 in the driven member, and are to admit of longitudinal movement therein of the outwardly-extending crooks 24, made in the actuating-bars 21.

A number of dogs 15 are arranged in opposite pairs in connection with the clutch member and in radial relation therewith, and the inner end of each of said dogs coincides with the corresponding groove 22 and slot 23, above referred to, and the outer ends of the dogs are adapted to engage the notches 14 of the corresponding rings when the respective dogs are moved outward. Each of said dogs has a slot 25 extending across its inner end and has also an enlarged axial bore 26 throughout its inner portion and also a guide-opening 27, which extends from the bore 26 to the outer end of the dog. A guide-pin 28, having a head 29 at its inner end, is mounted within the dog and ranges partially within the guide-opening, the head 29 extending within the bore 26 and normally coinciding with the slot 25. A compression-spring 30 extends around the shank of the pin 28 and acts against the head 29, so as to hold the latter toward the inner end of the dog. A pin 31 is fixed transversely at the inner end of the dog in line with the diameter thereof at right angles to the slot 25. When the dogs 15 are in position within the clutch member 9, the actuating-bars 21 extend through the slots 25 of the corresponding dogs and between the pins 31 and heads 29 thereof.

The actuating-bars are attached at their outer ends to a movable sleeve 32, mounted upon the driven member and are adapted to be moved in unity thereby. When the actuating-bars are shifted, the crooks 24 thereof act to move the dogs outward in opposite pairs severally by coming into contact with the corresponding heads 29. If, however, the outer ends of the dogs should come into contact with the adjacent ring at points between its notches, they will necessarily become detained in outward movement until the ring is moved so that its diametrical opposite notches register with the corresponding ends of the dogs. The crooks 24, however, may be drawn into full engagement with any of the pairs of dogs regardless of the particular position of the notches of the corresponding rings, and if the dogs are detained in outward movement by coming into contact with the rings, as above described, the springs will become compressed because of the action of the crooks against the heads of the guide-pins, and thereafter when the notches of the corresponding ring register with the adjacent ends of the dogs the latter will be moved outward into said notches by the expanding action of the springs so compressed. All of the dogs are normally held in innermost position by the engagement of the corresponding actuating-bar with the pins 31, which are fixed at the inner ends of the respective dogs. Thus it will appear that the dogs are afforded relief as occasion requires when being adjusted to their outward positions and will also be positively drawn to and held in their their innermost position according to the position of the actuating-bars. It will also appear that as the rings are respectively engaged by the corresponding pair of dogs the clutch member will thereby become driven according to the motion of the rings thus engaged.

Having described my invention, what I claim as new, and desire to secure by Letters Patent, is—

1. In a clutch, a driving-gear and driven member suitably mounted with their axial centers in alinement; a clutch member in fixed connection with the driven member and ranging within the flange of the driving-gear; oppositely-disposed dogs mounted in radial position in the clutch member and being adapted to be shifted inwardly and outwardly, the said driving-gear having notches within its flange to receive the outer ends of the dogs; a guide-pin arranged longitudinally within each of said dogs and having a head upon its end nearest the inner end of the dog; a compression-spring acting against said head to hold it in normal position, each of said dogs having a slot and transverse pin at its inner end; and actuating-bars in longitudinal movable relation with the driven member, having oppositely-disposed crooks, and engaged with the respective dogs, the crooks of said bars acting against said heads to move said dogs outwardly.

2. In a clutch, a clutch member having mounted thereon in movable relation therewith an internally-notched ring; a dog in connection with the clutch member adapted to be moved outwardly into engagement with said ring, and having a guide-pin with a head; a spring in connection with the dog and acting against the head of the guide-pin; a transverse pin at the inner end of the dog; and an actuating-bar having an outwardly-extending crook, and engaged with said dog between said head and transverse pin.

3. In a clutch, a clutch member having a ring mounted thereon in movable relation therewith, and having also one or more dogs adapted to engage the ring, each of said dogs having a transverse pin at its inner end; a guide-pin in movable relation with each of said dogs; a compression-spring in connection with each of said guide-pins acting respectively against the dogs to hold them in outermost position; and one or more actuating-bars in connection with the corresponding dogs and each having an outwardly-disposed crook adapted to move the respective dogs outward by coming into engagement with the corresponding guide-pins, and inward by engagement with said transverse pins.

4. In a clutch, a clutch member and a driving member, in combination with a dog movably mounted in the clutch member and having a guide-pin movably connected therewith, and having also a transverse pin at its inner end; a spring acting between the dog and guide-pin to hold the former toward its outermost position; and an actuating-bar in movable relation with the clutch member and extending through the inner portion of the dog between said transverse pin and inner end of the guide-pin, the said actuating-bar having a curved portion adapted to move said dog outwardly into engagement with the driving member by acting against the end of the guide-pin, and inwardly by engagement with said transverse pin.

In testimony whereof I affix my signature in presence of two witnesses.

MAURICE I. ROSENTHAL.

Witnesses:
HERMAN G. GRUBEL,
W. G. BURNS.